United States Patent
Ji

(10) Patent No.: US 10,417,549 B2
(45) Date of Patent: Sep. 17, 2019

(54) INSULATED PLUG WITH RFID TAG

(71) Applicant: Zhejiang Johar Technology Co., Ltd., Hangzhou (CN)

(72) Inventor: Honghong Ji, Hangzhou (CN)

(73) Assignee: Zhejiang Johar Technology Co., Ltd., Hangzhou (CN)

( * ) Notice: Subject to any disclaimer, the term of this patent is extended or adjusted under 35 U.S.C. 154(b) by 0 days.

(21) Appl. No.: 15/922,859

(22) Filed: Mar. 15, 2018

(65) Prior Publication Data

US 2018/0268277 A1    Sep. 20, 2018

(30) Foreign Application Priority Data

Mar. 15, 2017   (CN) .......................... 2017 1 0153031

(51) Int. Cl.

| | | |
|---|---|---|
| G06K 19/06 | (2006.01) | |
| G06K 19/077 | (2006.01) | |
| G06K 19/07 | (2006.01) | |
| H01Q 13/10 | (2006.01) | |
| H01Q 15/14 | (2006.01) | |
| H01Q 1/38 | (2006.01) | |
| H01Q 1/22 | (2006.01) | |
| H01Q 1/44 | (2006.01) | |
| H01Q 9/26 | (2006.01) | |
| H01Q 7/00 | (2006.01) | |

(52) U.S. Cl.
CPC ... *G06K 19/07749* (2013.01); *G06K 19/0723* (2013.01); *H01Q 1/2225* (2013.01); *H01Q 1/38* (2013.01); *H01Q 1/44* (2013.01); *H01Q 9/265* (2013.01); *H01Q 13/10* (2013.01); *H01Q 15/14* (2013.01); *H01Q 7/00* (2013.01)

(58) Field of Classification Search
CPC .......... H01Q 1/14; H01Q 1/2225; H01Q 1/36; H01Q 1/38; H01Q 1/44; H01Q 1/528; H01Q 7/00; H01Q 9/265; H01Q 13/10; H01Q 13/106; H01Q 13/12; H01Q 15/14; H01Q 15/142; H01Q 19/023
See application file for complete search history.

(56) References Cited

U.S. PATENT DOCUMENTS

| | | | | |
|---|---|---|---|---|
| 6,441,740 B1 * | 8/2002 | Brady | .................. | B65D 25/205 |
| | | | | 340/572.7 |
| 9,477,921 B2 * | 10/2016 | Troeger | ............... | H01Q 1/2225 |

(Continued)

*Primary Examiner* — Thien M Le
*Assistant Examiner* — April A Taylor
(74) *Attorney, Agent, or Firm* — Schwegman Lundberg & Woessner, P.A.

(57) ABSTRACT

This invention provides an insulated plug with an RFID tag including a main body and the RFID tag. The main body includes a conductive rod. The RFID tag includes a tag antenna and a tag chip connected at a feeding part of the tag antenna. The tag antenna includes a substrate and an antenna structure. The substrate has an installation hole, and the conductive rod passes through the installation hole and is fixed with the installation hole. The antenna structure is disposed at the substrate and includes a radiation part, a reflection part and a connection part. The radiation part is formed at one end of the substrate and has a feeding part. The reflection part is formed at the other end of the substrate and is closed. The connection part is disposed at the substrate and is electrically connected with the radiation part and the reflection part.

8 Claims, 7 Drawing Sheets

(56) References Cited

U.S. PATENT DOCUMENTS

| | | | |
|---|---|---|---|
| 2004/0183736 A1* | 9/2004 | Sato | H01Q 1/243 343/725 |
| 2014/0125460 A1* | 5/2014 | Sinnett | G06K 7/0008 340/10.1 |

* cited by examiner

INSULATED PLUG WITH RFID TAG

CROSS-REFERENCE TO RELATED APPLICATIONS

This Non-provisional application claims priority under 35 U.S.C. § 119(a) on Patent Application No(s). 201710153031.4 filed in People's Republic of China on Mar. 15, 2017, the entire contents of which are hereby incorporated by reference.

BACKGROUND OF THE INVENTION

Field of the Invention

This invention relates to a technical field of radio frequency identification, and more particularly, to an insulated plug with an RFID tag.

Description of the Related Art

At present, passive UHF RFID technology has been widely used in various industries. A passive UHF RFID sensor chip developed according to the RFID technology combined with a sensor technology has made the UHF RFID technology more widely and deeply applied in the fields of electric power and other industries. In a power ring grid cabinet, a working voltage is often above 10 KV, key nodes in a cable often have heating phenomenon with a high temperature, and these nodes are always important hidden danger points in power accidents. Therefore, an application with an RFID tag having a testing temperature function can monitor key nodes real-time, so as to prevent the accidents and greatly reduce an incidence of the accidents.

A power cabinet are often located at a T-type cable connector. The T-type cable connector is used for a main grid system of a cable distribution box or as an inlet and outlet connector of a ring grid cabinet. The T-type cable connector can be connected with not only a high voltage bushing of more than 600A and a multi joint socket, but also a 600A bus bushing and a rear T-type cable connector combination to form a multi-way cable branch. The T-type cable connectors are generally divided into front inserts and rear inserts and can be used together with insulating plugs in order to achieve the role of insulation, sealing and shunting. The T-type cable connectors generally include conductive rods, bolts, flat pads, spring washers, nuts, insulating plugs containing gaskets and other metal components therein, crimp terminals and other metal structures. However, the metal structure has a reflection effect on the energy of the antenna, and the cylindrical space of the T-shaped cable connector is narrow, which makes the existing temperature-measuring tag difficult to be placed therein or difficult to read and use. Therefore, the existing insulation plug is very difficult to achieve temperature monitoring of the connector inside the T-type cable connector.

BRIEF SUMMARY OF THE INVENTION

In order to overcome the problem that the existing insulated plug cannot achieve temperature monitoring at the T-type cable connector, this invention provides an insulated plug with an RFID tag.

To achieve the above-mentioned objective, this invention provides the insulated plug with the RFID tag, and the insulated plug includes a main body and an RFID tag. The main body includes a conductive rod. The RFID tag includes a tag antenna and a tag chip connected with a feeding part of the tag antenna. The tag antenna includes a substrate and an antenna structure. The substrate has an installation hole, and the conductive rod passes through the installation hole and is fixed with the installation hole. The antenna structure is disposed at the substrate, and the antenna structure includes a radiation part, a reflection part and a connection part. The radiation part is formed at one end of the substrate, and the radiation part has the feeding part. The reflection part is formed at the other end of the substrate and is closed, and the reflection part reflects energy radiated from the radiation part. The connection part is disposed at the substrate and is electrically connected with the radiation part and the reflection part.

In one embodiment of this invention, the radiation part may be a ring, and the feeding part may be a feeding slot running through the radiation part along a radial direction of the ring.

In one embodiment of this invention, the reflection part may be a ring, and a ring width of the reflection part may be larger than a ring width of the radiation part.

In one embodiment of this invention, ring widths and circumferences of the radiation part and the reflection part may match with impedance of the tag chip connected with the feeding part.

In one embodiment of this invention, the substrate may have at least one wire passing hole, and the connection part may pass through at least one wire passing hole and be electrically connected with the radiation part and the reflection part.

In one embodiment of this invention, the connection part may be a metal strip disposed at a sidewall of the substrate and extending to both ends of the substrate, and the metal strip may be electrically connected with the radiation part and the reflection part.

In one embodiment of this invention, the substrate may be cylindrical, a center of the substrate may have an installation hole running through the substrate along an axial direction of the substrate, and an outer diameter of the substrate may be larger than or equal to a maximum width of the reflection part.

In one embodiment of this invention, the radiation part and the reflection part may be pressed on the substrate, and the material of the radiation part and the reflection part may be a metal or a conductive alloy, respectively. The substrate may be an FR-4 epoxy glass fiber plate, a plastic plate, a ceramic plate or a foam plate.

To sum up, in the insulated plug with the RFID tag provided in this embodiment, by disposing the installation hole corresponding to the conductive rod at the substrate of the tag antenna, the RFID tag is fixed inside the main body of the insulated plug through the installation hole. When the tag chip on the RFID tag is set to be a chip with a function of testing temperature, an external reading and writing device can monitor an internal temperature of the insulated plug by reading the RFID tag. In addition, in the tag antenna, by forming the radiation part and the reflection part at both ends of the substrate and setting the reflection part to be closed, the energy radiated from the radiation part is superimposed after being reflected by the reflection part so as to increase the gain of the tag antenna and greatly increase the recognition distance of the tag antenna. And when the RFID tag antenna is attached to a metal (a fixing piece such as a nut), the reflection part can shield the effect of the metal located at the side of the reflection part so as to increase the recognition distance and achieve an anti-metal effect.

Further, by setting the widths and the circumferences of the radiation part and the reflection part to match the impedance of the tag chip connected with the feeding part, the transmission coefficient of the antenna is increased, thereby increasing the recognition distance of the tag antenna. Further, the gain of the antenna can be increased by increasing the thickness of the substrate such that the energy reflected by the reflection part and the energy radiated by the radiation part can be further superposed remotely to obtain a longer recognition distance. By installing the installation hole at the substrate, the conductive rod in the insulated plug can pass through the installation hole and be fixedly connected with the tag, thereby solving the installation problem of the tag in the insulated plug. The tag antenna has a simple structure and is particularly suitable for mass production.

The above and other objectives, features and advantages of the present invention will become more apparent with the following detailed description of the preferred embodiments and the accompanying drawings.

DETAILED DESCRIPTION OF THE INVENTION

Figure 1:
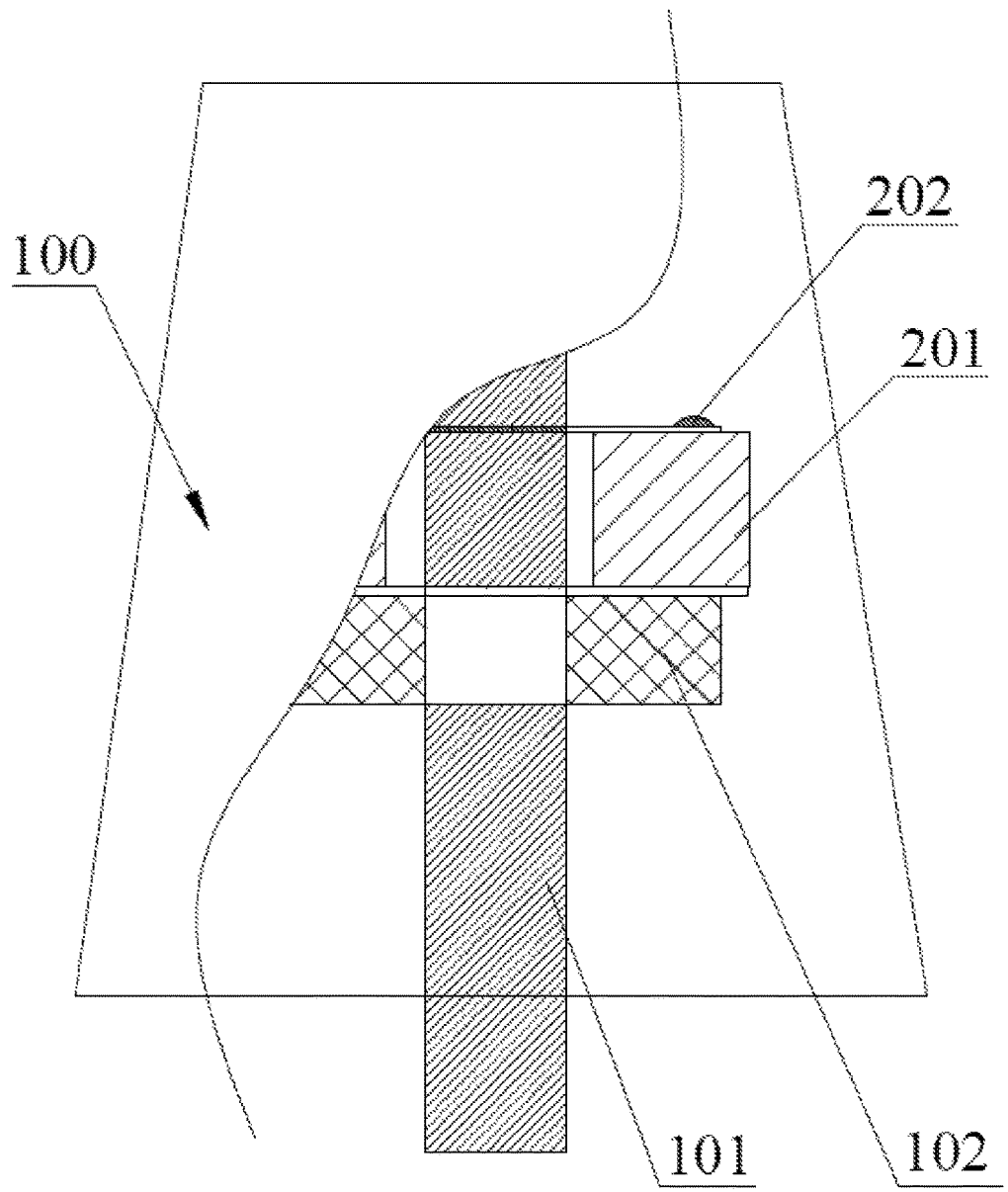
FIG. 1 is a structural schematic diagram of an insulated plug with an RFID tag provided by one embodiment of the present invention.
Figure 2:
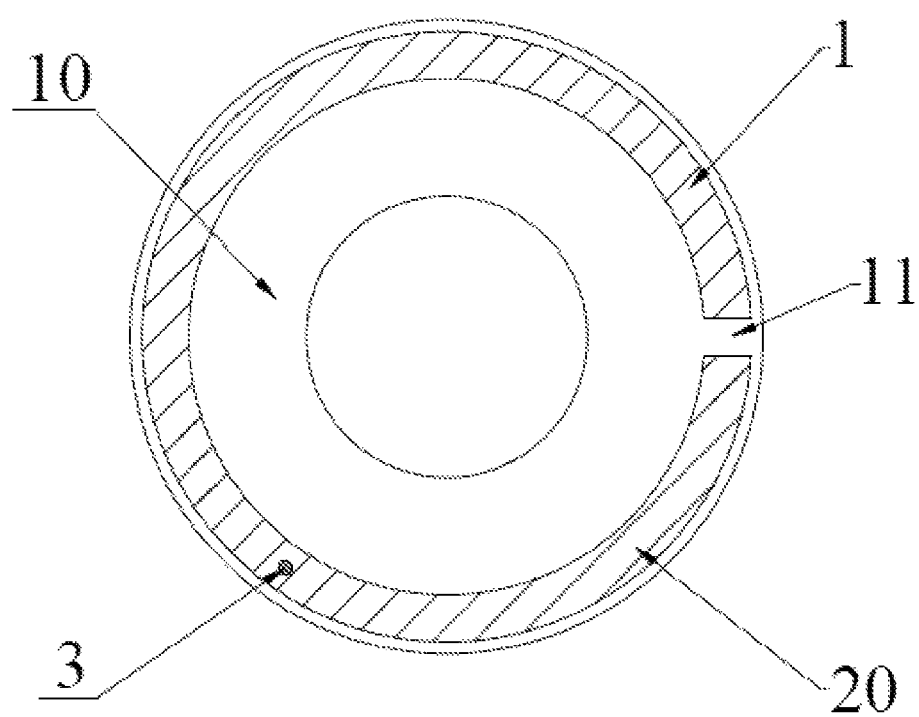
FIG. 2 is a bottom view of a tag antenna in FIG. 1.
Figure 3:
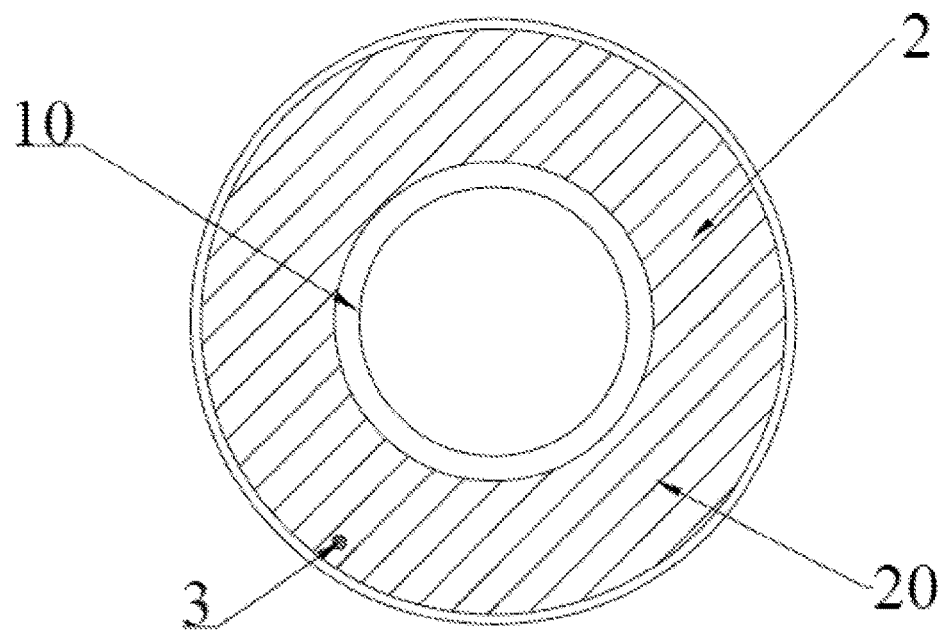
FIG. 3 is a top view of the tag antenna in FIG. 1.
Figure 4:
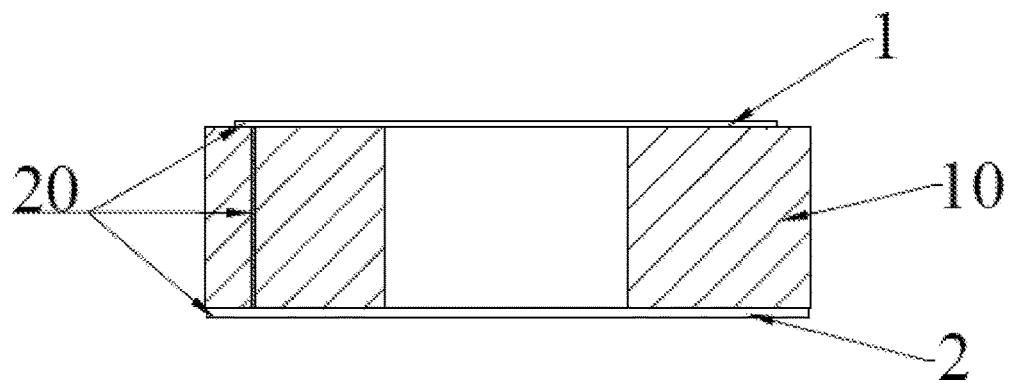
FIG. 4 is a sectional view of the tag antenna in FIG. 1.
Figure 5:
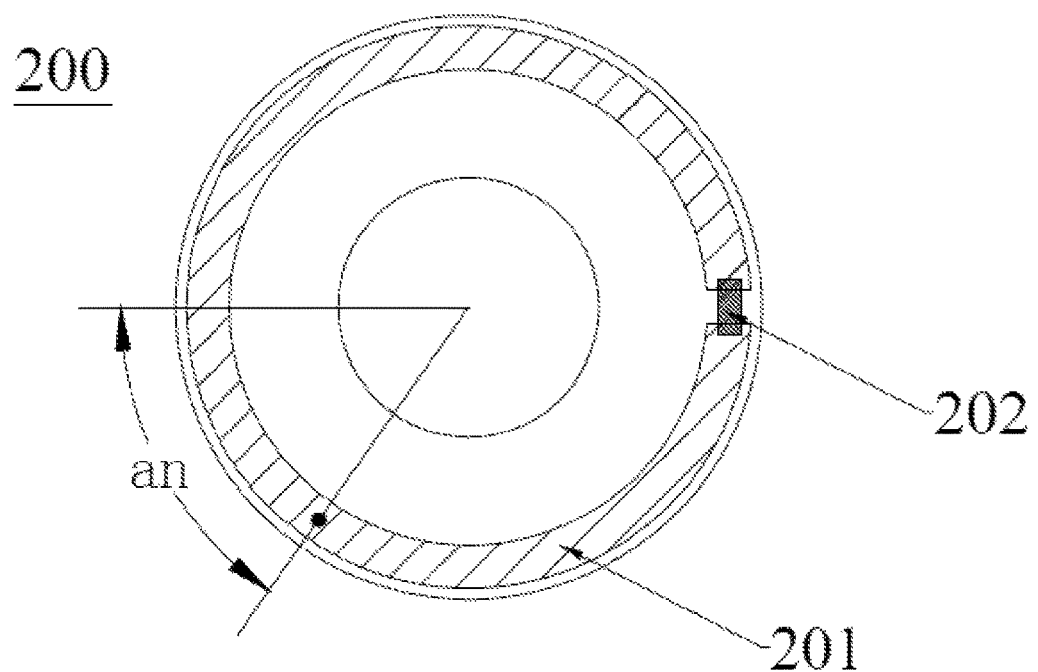
FIG. 5 is a bottom view of an RFID tag provided by one embodiment of the present invention.

As shown in FIG. 1 to FIG. 5, this embodiment provides an insulated plug with an RFID tag including a main body 100 and an RFID tag 200. The main body 100 includes a conductive rod 101 and a fixing piece 102. The RFID tag 200 includes a tag antenna 201 and a tag chip 202 connected with a feeding part of the tag antenna 201. The tag antenna 201 includes a substrate 10 and an antenna structure 20. The substrate 10 has an installation hole, and the conductive rod 101 passes through the installation hole and is fixed with the installation hole. The antenna structure 20 is disposed at the substrate 10, and the antenna structure 20 includes a radiation part 1, a reflection part 2 and a connection part 3. The radiation part 1 is formed at one end of the substrate 10, and the radiation part 1 has a feeding part 11. The reflection part 2 is formed at the other end of the substrate 10 and is closed, and the reflection part 2 reflects energy radiated from the radiation part 1. The connection part 3 is disposed at the substrate 10 and is electrically connected with the radiation part 1 and the reflection part 2.

In this embodiment, the fixing piece 102 is located under the reflection part 2 of the tag antenna 201, and the fixing piece 102 is fixedly connected with the RFID tag 200 and the conductive rod 101. In this embodiment, the fixing piece 102 is a nut. However, this invention is not limited thereto.

In this embodiment, the tag chip 202 is connected with the feeding part 11 in a binding way. However, this invention is not limited thereto. In other embodiments, the tag chip 202 can be connected with the feeding part 11 in a welding way.

In this embodiment, by disposing the RFID tag 200 and the tag chip 201 with a function of testing temperature inside the main body 100 of the insulated plug, an external reading and writing device can monitor an internal temperature of the insulated plug by reading the RFID tag 200. This is only one application way of the insulated plug with the RFID tag. This invention is not limited thereto. In other embodiments, different functions can be achieved by using tag chips with different functions, for example, an internal humidity of the insulated plug can be monitored when an tag chip with a function of testing humidity is adopted.

In the tag antenna, the closed reflection part 2 can reflect the energy radiated from the radiation part 1, and the reflected energy is superimposed on the energy radiated from the radiation part 1 so as to increase the energy radiated from the radiation part 1, which greatly increases a gain of the tag antenna and enables the tag antenna to have a relatively large recognition distance even when applied in metal environment (such as a nut and other fixing pieces); at the same time, the reflection part 2 can also shield a gain effect of metal located at the side of the reflection part 2 to the radiation part 1 so as to achieve an anti-metal effect.

In this embodiment, both the radiation part 1 and the reflection part 2 are rings, and this setting makes currents represented by the radiation part 1 and the reflection part 2 distributed in ring-shapes, which can partly shield an effect of a metal conductor passing through the radiation part 1 and the reflection part 2, and make the tag antenna more resistant to the metal. Further, the ring width of the reflection part 2 is greater than that of the radiation part 1. This setting allows the reflection part 2 to largely reflect the energy radiated by the radiation part 1, thereby greatly increasing the gain of the antenna. Preferably, the radiation part 1 has an outer diameter of 13 mm and an inner diameter of 11 mm, and the ring width of the radiation part 1 is 2 mm. The reflection part 2 has an outer diameter of 13 mm and an inner diameter of 6 mm, and the ring width of the reflection part 2 is 7 mm. However, this invention is not limited thereto. In actual applications, the width and the circumference of the radiation part 1 and the reflection part 2 may affect the impedance of the antenna structure 20. In order to achieve impedance matching between the antenna and the tag chip, the width and the circumference of the radiation part 1 and the reflection part 2 need to be optimized. Specifically, if the tag chip has the input impedance of re−j*im at an operating frequency of 915 MHz (the input impedance of the antenna is a complex number, wherein re is the real part, im is the imaginary part, and j is the imaginary unit), when the width and the circumference of the radiation part 1 and the reflection part 2 are designed, the impedance of the antenna structure 20 should be as close as possible to re+j*im. Impedance matching can greatly reduce the loss of signal energy in a transmission process and greatly improve a reading distance of a signal.

In other embodiments, the gain of the tag antenna can be further increased by changing a thickness of the substrate 10. Specifically, when the thickness d of the substrate 10 equals to 0.25λ, waves emitted by the radiation part 1 and waves reflected by the reflection part 2 are superposed to further increase the recognition distance of the tag, and λ is the medium wavelength of the wave emitted by the radiation part 1 in the substrate medium.

In order to match the radiation part and the reflection part and to have a better supporting function, in this embodiment, the substrate 10 is set to be the shape of a cylinder, a center of the substrate 10 has an installation hole along an axial direction of the substrate 10, and the outer diameter of the substrate 10 is larger than or equal to the maximum width of the reflection part 2.

In this embodiment, the feeding part 11 is a feeding slot that runs through the radiation part 1 along a radial direction of the ring. Preferably, the specific structure of the feeding slot is a rectangle, and the length of the rectangular feeding slot is 2 mm. In order to facilitate the welding of the tag chip, the width of the rectangular feeding slot is slightly larger than the maximum width of the tag chip. In this embodiment, the width of the rectangular feeding slot is also 2 mm. However, this invention is not limited thereto. In other embodiments, the shape of the feeding part may be other feeding slots or feeding ports matching the shape of the tag chip, and the corresponding size may also be designed according to the size of the tag chip.

In this embodiment, the substrate 10 has at least one wire passing hole running through the substrate along the axial direction. In this embodiment, the substrate 10 has one wire passing hole. However, this invention is not limited thereto. The connection part 3 is electrically connected with the radiation part 1 and the reflection part 2 through the wire passing hole. In this embodiment, the radiation part 1 and the reflection part 2 is pressed at the substrate 10, therefore the wire passing hole is set to be a wire passing hole. However, this invention is not limited thereto. In other embodiments, the connection part is a metal strip disposed at a sidewall of the substrate and extends to both ends of the substrate, and the metal strip is electrically connected with the radiation part and the reflection part.

In this embodiment, a radius of the metal wire passing hole is 0.5 mm. However, this invention is not limited thereto. As the connection part 3 belongs to a part of the antenna structure, impedance of the connection part 3 is a part of the impedance of the antenna. Therefore, the specific connection method of the connection part 3 needs to be considered when the impedance matching is designed.

Under a free space condition, the recognition distance between a reader and an electronic tag is calculated by the following formula:

$$R = \frac{\lambda}{4\pi} \sqrt{\frac{EIRP * G_{tag} * \tau}{P_{th}}}$$

Under a condition that $P_{th}$ (the minimum triggering threshold power of RFID chip) and EIRP (gain parameters related to the reader) are certain values, the recognition distance R is mainly determined by the gain $G_{tag}$ of the tag antenna and a transmission coefficient $\tau$. The impedance matching between the tag antenna 201 and the tag chip 202 directly affect the transmission coefficient $\tau$.

Figure 6:
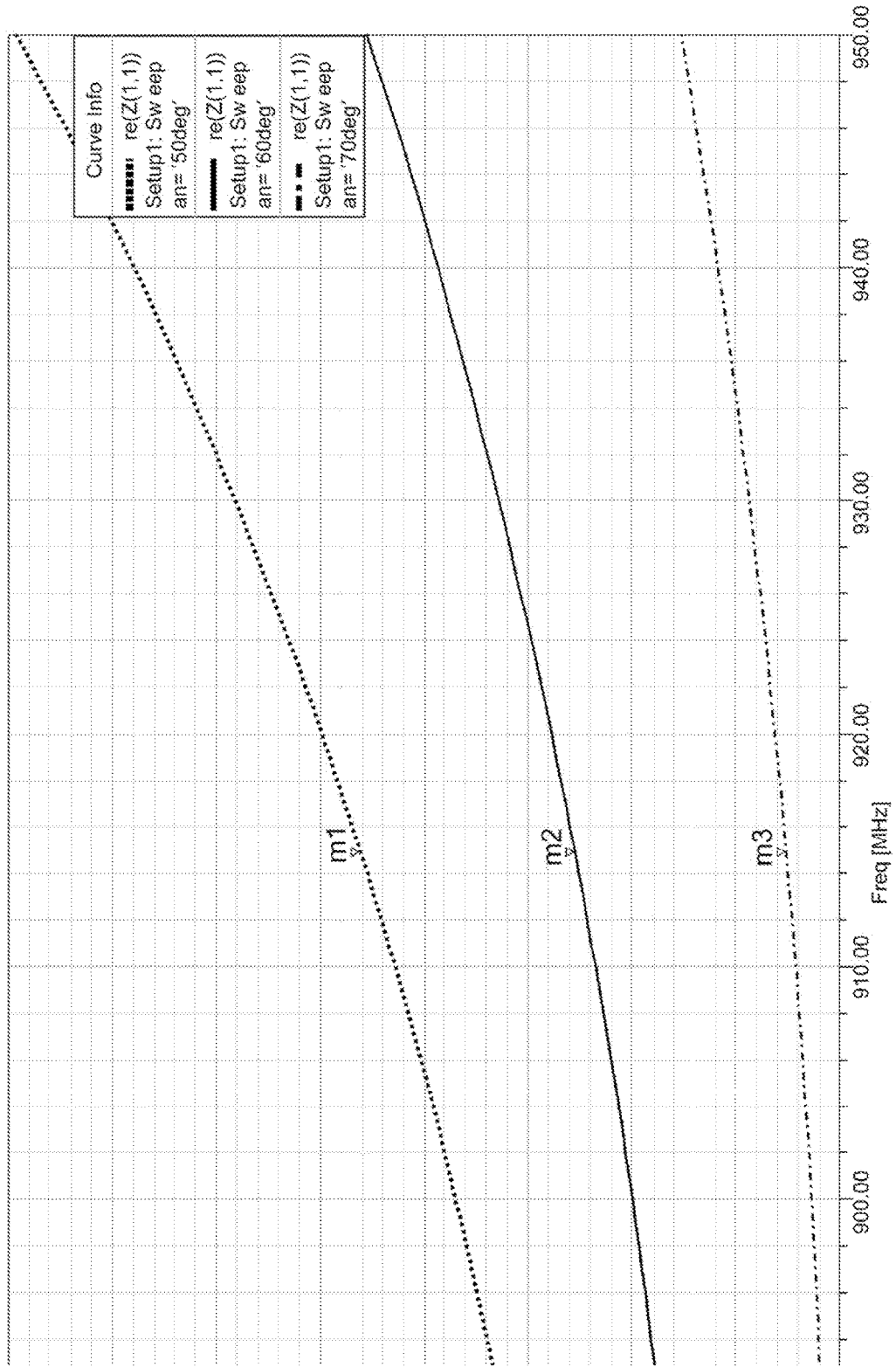
FIG. 6 is a variation curve showing that a real part of impedance of the antenna changes with a frequency when a metal wire passing hole is at different angles in the tag antenna shown in FIG. 2.
Figure 7:
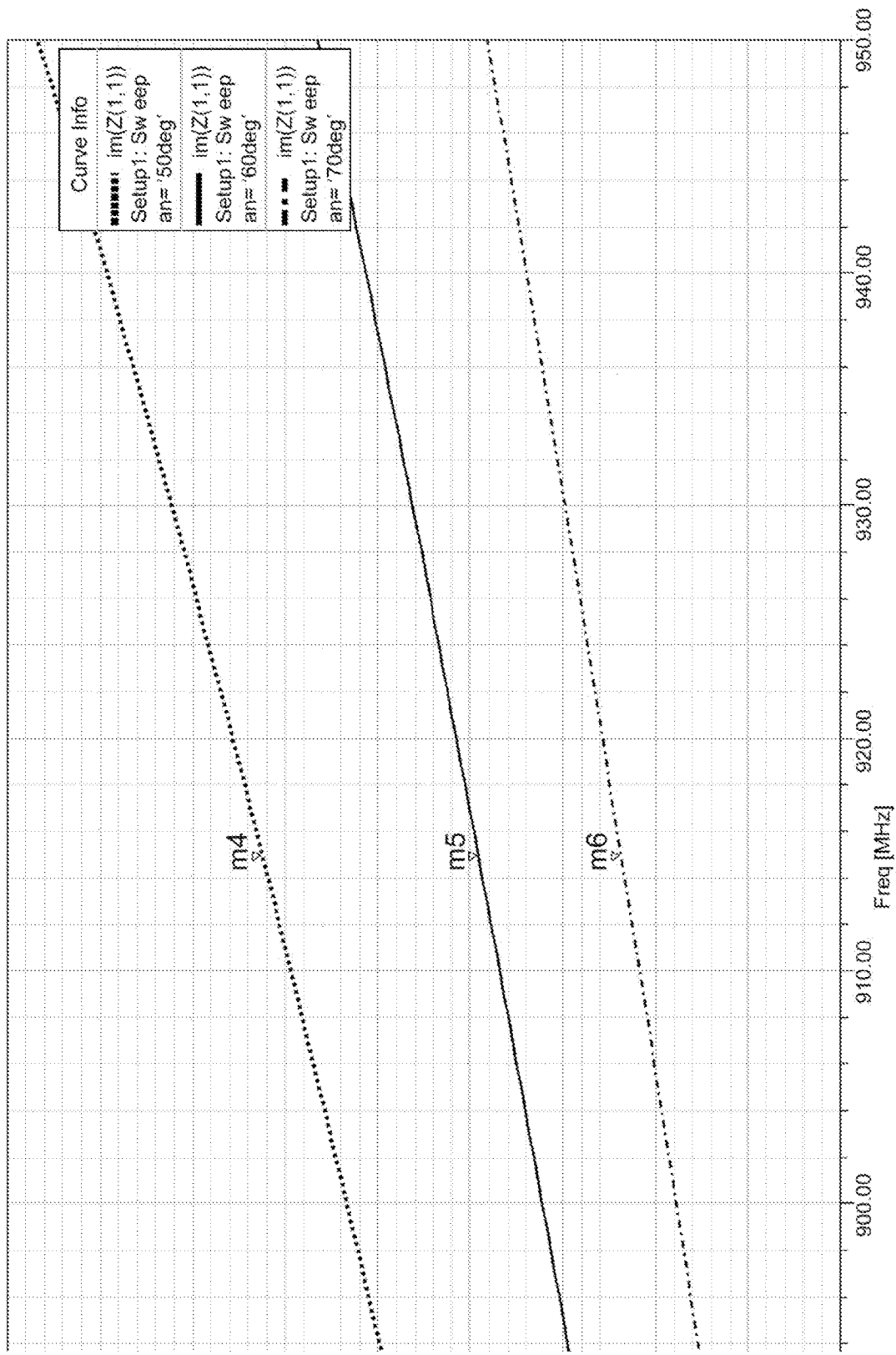
FIG. 7 is a variation curve showing that an imaginary part of the impedance of the tag antenna changes with a frequency when the metal wire passing hole is at different angles in the tag antenna shown in FIG. 2.

In the RFID tag provided by this embodiment, the position of the wire passing hole directly affects the impedance of the tag antenna 201. Take a center line of the tag chip along the radial direction as a base line, and an angle between the straight line passing through the center of a circle of the metal wire passing hole and the center of a circle of the substrate and the base line as an angle an of the metal wire passing hole on the substrate. FIG. 6 is a curve that the real part re (Z (1,1)) of the impedance of the tag antenna changes with a frequency when the metal wire passing hole is under the condition that the angle an=50, 60, 70. From the figure, the real part of the impedance of the tag antenna is respectively 5.5, 7.6 and 9.6 ohms at the frequency of 915 Mhz. The corresponding curve in FIG. 6 is m1, m2 and m3, respectively. FIG. 7 is a curve that the imaginary part im (Z (1,1)) of the impedance of the tag antenna changes with the frequency when the metal wire passing hole is under the condition that the angle an=50, 60, 70. From the figure, the imaginary part of the impedance of the tag antenna is respectively 256.2, 197.8 and 159.3 ohms at the frequency of 915 Mhz. The corresponding curve in FIG. 7 is m4, m5 and m6, respectively. In an optimization design of the impedance matching, the tag chip matching with impedance of the antenna structure 20 is selected by determining the positions of the radiation part 1, reflection part 2 and the metal wire passing hole in the antenna structure 20 so as to achieve the impedance matching. It is also possible to match a certain tag chip by adjusting the position of the metal wire passing hole on the substrate or the size of the radiation part 1 and the size of the reflection part 2. Compared with the size of radiation part 1 and the size of reflection part 2, the change of the position of the metal wire passing hole is easier, that is, the impedance of the tag antenna at the frequency of 915 Mhz can be easily adjusted to a conjugate impedance of the tag chip, and the transmission coefficient is greatly increased, thereby greatly increasing the recognition distance.

Figure 8:
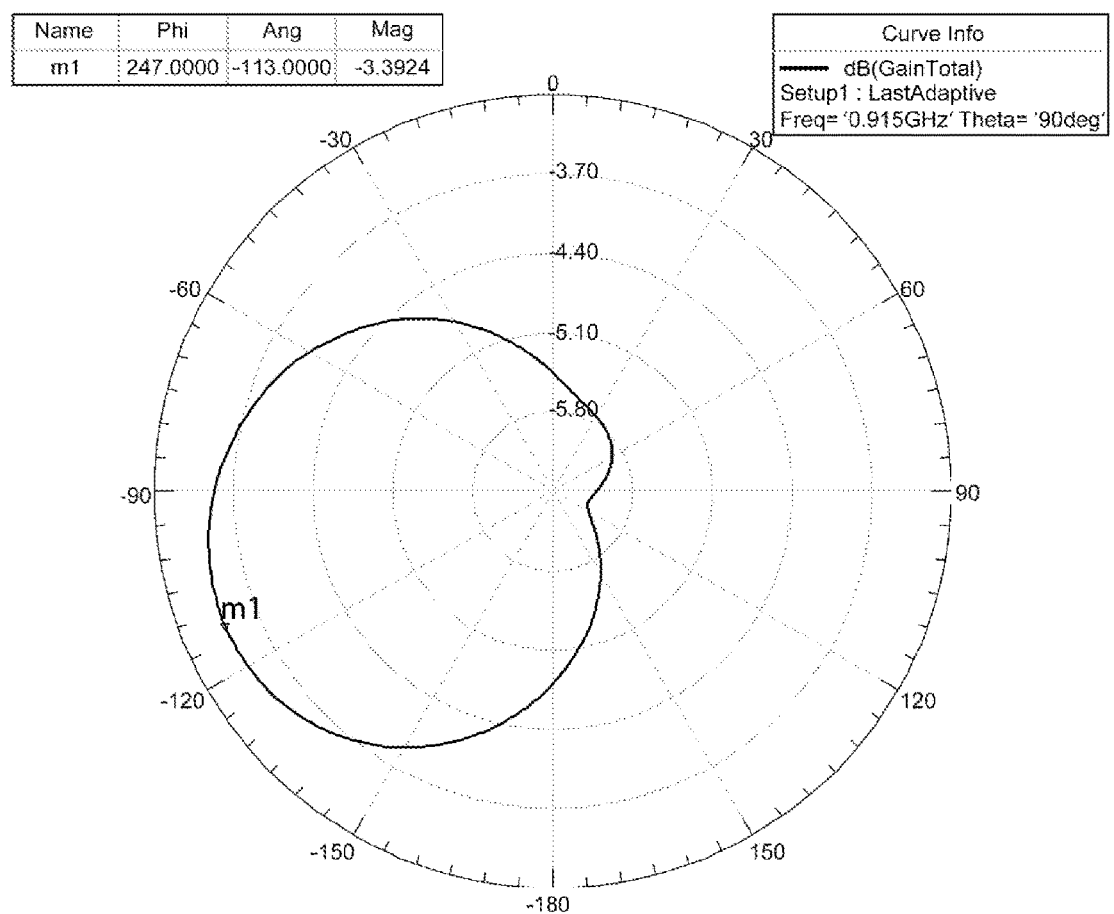
FIG. 8 is a gain direction diagram when the metal wire passing hole is at an angle an=70 in the RFID tag shown in FIG. 5.

As shown in FIG. 8, when the angle of the metal wire passing hole is 70 and matches with the impedance of the tag chip 202, the maximum gain of the RFID tag can reach to −3.3924 dBi, which far more exceeds the existing miniaturized anti-metal tag.

In this embodiment, the antenna structure 20 is made of a copper material. However, this invention is not limited thereto. In other embodiments, the antenna structure 20 can be made of a metal material such as gold, silver, aluminum and so on, or a conductive alloy such as solder. In this embodiment, the substrate 10 is an FR-4 epoxy glass fiber plate. However, this invention is not limited thereto. In other embodiments, the substrate 10 may be a plastic plate, a ceramic plate or a foam plate.

To sum up, in the insulated plug with the RFID tag provided in this embodiment, by disposing the installation hole corresponding to the conductive rod at the substrate of the tag antenna, the RFID tag is fixed in the main body of the insulated plug through the installation hole. When the tag chip on the RFID tag is set to be a chip with a function of testing temperature, an external reading and writing device can monitor an internal temperature of the insulated plug by reading the RFID tag. In addition, in the tag antenna, by forming the radiation part and the reflection part at both ends of the substrate and setting the reflection part to be closed, the energy radiated from the radiation part is superimposed after being reflected by the reflection part so as to increase the gain of the tag antenna and greatly increase the recognition distance of the tag antenna. And when the RFID tag antenna is attached to a metal (a fixing piece such as a nut), the reflection part can shield the effect of the metal located at the side of the reflection part so as to increase the recognition distance and achieve an anti-metal effect.

In addition, by setting the widths and the circumferences of the radiation part and the reflection part to match the impedance of the tag chip connected with the feeding part, the transmission coefficient of the antenna is increased, thereby increasing the recognition distance of the tag antenna. Further, the gain of the antenna can be increased by increasing the thickness of the substrate such that the energy reflected by the reflection part and the energy radiated by the radiation part can be further superposed remotely to obtain a longer recognition distance. By installing the installation hole at the substrate, the conductive rod in the insulated plug can pass through the installation hole and be fixedly connected with the tag, thereby solving the installation problem of the tag in the insulated plug. The tag antenna has a simple structure and is particularly suitable for mass production.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An insulated plug with an RFID tag comprising: a main body comprising a conductive rod; and
    an RFID tag comprising a tag antenna and a tag chip connected with a feeding part of the tag antenna, and the tag antenna comprising:
        a substrate having an installation hole, and wherein the conductive rod passes through the installation hole and is fixed with the installation hole; and
        an antenna structure disposed at the substrate, and the antenna structure comprising:
            a radiation part formed at one end of the substrate, wherein the radiation part has the feeding part;
            a reflection part formed at the other end of the substrate and being closed, wherein the reflection part reflects energy radiated by the radiation part; and
            a connection part disposed at the substrate and electrically connected with the radiation part and the reflection part.

2. The insulated plug with the RFID tag according to claim 1, wherein the radiation part is a ring, and the feeding part is a feeding slot running through the radiation part along a radial direction of the ring.

3. The insulated plug with the RFID tag according to claim 1, wherein the reflection part is
    a ring, and a ring width of the reflection part is larger than a ring width of the radiation part.

4. The insulated plug with the RFID tag according to claim 1, wherein ring widths and circumferences of the radiation part and the reflection part match with impedance of the tag chip connected with the feeding part.

5. The insulated plug with the RFID tag according to claim 1, wherein the substrate has at
    least one wire passing hole, and the connection part passes through the at least one wire passing hole and is electrically connected with the radiation part and the reflection part.

6. The insulated plug with the RFID tag according to claim 1, wherein the connection part is a metal strip disposed at a sidewall of the substrate and extending to both ends of the substrate,
    and the metal strip is electrically connected with the radiation part and the reflection part.

7. The insulated plug with the RFID tag according to claim 1, wherein the substrate is cylindrical, a center of the substrate has the installation hole running through the substrate along an axial direction of the substrate, and an outer diameter of the substrate is larger than or equal to a maximum width of the reflection part.

8. The insulated plug with the RFID tag according to claim 1, wherein the radiation part and the reflection part are pressed on the substrate, a material of the radiation part and the reflection part is a metal or a conductive alloy, respectively, and the substrate is an FR-4 epoxy glass fiber plate, a plastic plate, a ceramic plate or a foam plate.

* * * * *